United States Patent [19]

Yokote et al.

[11] Patent Number: 5,220,505
[45] Date of Patent: * Jun. 15, 1993

[54] HEIGHT CONTROL SYSTEM IN AUTOMOTIVE SUSPENSION SYSTEM WITH HUNTING PREVENTIVE FEATURE

[75] Inventors: Masatsugu Yokote, Yokohama; Hideo Ito, Zushi; Kenji Kawagoe, Yokosuka, all of Japan

[73] Assignee: Nissan Motor Company, Ltd., Tokyo, Japan

[*] Notice: The portion of the term of this patent subsequent to Sep. 10, 2008 has been disclaimed.

[21] Appl. No.: 724,665

[22] Filed: Jul. 2, 1991

Related U.S. Application Data

[63] Continuation of Ser. No. 135,110, Dec. 18, 1987, Pat. No. 5,047,938.

[30] Foreign Application Priority Data

Dec. 19, 1986 [JP] Japan .................. 61-303159

[51] Int. Cl.$^5$ ........................................ B60G 17/015
[52] U.S. Cl. .................... 364/424.05; 280/6.12; 280/707
[58] Field of Search ........... 364/424.05; 280/6.1, 280/6.11, 6.12, 698, 702, 707, 708, 714, 840

[56] References Cited

U.S. PATENT DOCUMENTS

| | | | |
|---|---|---|---|
| 4,377,299 | 3/1983 | Fujii | 280/708 |
| 4,593,931 | 6/1986 | Shiratori et al. | 280/714 |
| 4,659,104 | 4/1987 | Tanaka et al. | 280/707 |
| 4,669,749 | 6/1987 | Tanaka et al. | 280/707 |
| 4,697,237 | 9/1987 | Tanaka et al. | 364/424.05 |
| 5,047,938 | 9/1991 | Yokote et al. | 364/424.05 |

FOREIGN PATENT DOCUMENTS 3321510 6/1983 Fed. Rep. of Germany .
3437217 10/1984 Fed. Rep. of Germany .

Primary Examiner—Parshotam S. Lall
Assistant Examiner—Collin W. Park
Attorney, Agent, or Firm—Pennie & Edmonds

[57] ABSTRACT

A height control system in an automotive suspension system has a pressure supply network for adjusting pressure in a plurality of height adjusting actuator in respective suspension systems for adjusting relative distance between the vehicle body and suspension members at portions where the suspension systems are provided. The height control system includes a communication control valve provided in the pressure supply network so as to selectively establish and block fluid communication between the pressure supply network and one of the height control actuator. The communication control valve is to be operated to open for establishing fluid communication between one of the at least two actuators and the communication passage means when at least one of the height levels at the at least two portions is out of a predetermined target height range, and to close the communication control valve while all of the height levels monitored are within the predetermined target height range. By presence of the communication control valve, the hunting in height adjustment can be successfully eliminated.

5 Claims, 6 Drawing Sheets

HEIGHT CONTROL SYSTEM IN AUTOMOTIVE SUSPENSION SYSTEM WITH HUNTING PREVENTIVE FEATURE

This is a continuation application of Ser. No. 07/135,110, filed Dec. 18, 1987, now U.S. Pat. No. 5,047,938.

BACKGROUND OF THE INVENTION

1. Field of the Invention

The present invention relates generally to a height control system in an automotive suspension system for regulating the height level of a vehicle body relative to a suspension member which rotatingly supports the vehicle wheel. More specifically, the invention relates to a height control system capable of preventing hunting in height regulating operation.

2. Description of the Background Art

Various vehicle height control or height regulation systems have been developed and applied vehicles in the market. One of the known vehicle height control system is illustrated in the Japanese Patent First (unexamined) Publication No. 58-112817, published on Jul. 5, 1983. In the shown vehicular height control system, the height level of the vehicle body relative to suspension member is monitored and height control is performed with respect to each wheel position independently of other wheel positions. Such control is generally successful in regulating vehicular attitude.

In addition, in the shown system, when a demand for increasing height of the vehicle body relative to the corresponding suspension member, which demand will be hereafter referred to as "up-demand" and a demand for decreasing height of the vehicle body, which demand will be hereafter referred to as "down-demand" simultaneously occur, height control operation for increasing height in response to the up-demand, which control operation will be hereafter referred to as "up-control", is given higher priority than height control operation for decreasing height in response to the down demand, which control operation will be hereafter referred to as "down-control".

In such a conventional suspension control system, a hunting in adjustment of the vehicular body height level occurs when balance of load distribution is broken. Namely, in a certain vehicular driving conditions gravity center of the vehicle body shifts significantly to concentrate gravitational load to two or three wheels (hereafter referred to as "loaded wheel" to cause substantially no load condition for the remaining wheel or wheels (hereafter referred to as "unloaded wheel"). By concentrating the gravitational load, relative distance between the vehicle body and loaded wheel is reduced to cause the up-demand. On the other hand, by substantial reduction of the load at the unloaded wheel, down-demand occurs at the unloaded wheel. As set forth above, since up-control is given higher priority, up-control occurs in this situation.

Generally, as is known from the art, up-control operation is performed by increasing pneumatic pressure in a pneumatic chamber provided with a suspension strut assembly. In such case, pressurized gas tends to be introduced into the pneumatic chambers of the suspension strut supporting the unloaded wheel to further increase the height of the vehicle body at the unloaded wheel. This may affect the attitute of the vehicle and affect height adjustment at the loaded wheels. As a result, over-shooting in adjustment of the height level at respective wheels tends to occur, causing hunting. This leads to an uncomfortable variation of the vehicular height level, thus degrading the riding comfort of the vehicle.

SUMMARY OF THE INVENTION

It is therefore an object of the present invention to provide a height control system in an automotive suspension system, which can prevent height control from causing hunting.

In order to accomplish the aforementioned and other objects, a height control system in an automotive suspension system, according to the present invention, has a pressure supply network for adjusting pressure in a plurality of height adjusting actuator in respective suspension systems for adjusting the relative distance between the vehicle body and suspension members at portions where the suspension systems are provided. The height control system includes a communication control valve provided in the pressure supply network so as to selectively establish and block fluid communication between the pressure supply network and one of the height control actuators. The communication control valve is to be operated to open for establishing fluid communication between one of the at least two actuators and the communication passage means when at least one of the height levels is out of a predetermined target height range, and to close the communication control valve while all of the height levels monitored are within the predetermined target height range. By presence of the communication control valve, the hunting in height adjustment can be successfully eliminated.

According to one aspect of the invention, a height control system for an automotive vehicle, comprises a plurality of suspension systems, each suspending a vehicular body relative to a corresponding vehicular wheel, a variable pressure actuator filled with pressurized working fluid and associated with each of the systems for adjusting relative distance between the vehicle body and the vehicular wheel, a pressure supply system including a pressurized working fluid source, for increasing and decreasing pressure of the working fluid in the actuator for adjusting the relative distance between the vehicular body and the vehicular wheel, a plurality of pressure control valve means disposed within the pressure supply system for selectively establishing and blocking fluid communication between the pressure supply system and the corresponding actuators, a communication passage means provided downstream of one of the pressure control valve means and connecting at least two of the actuators, a communication control valve disposed within the communication passage means for establishing and blocking fluid communication between one of at least two actuators and the communication passage means, means for monitoring vehicular height at at least two different portions of the vehicle and operating the communication control valve to open for establishing fluid communication between one of the at least two actuators and the communication passage means when at least one of the height levels at the at least two portions is out of a predetermined target height range, and to close the communication control valve while all of the height levels monitored are within the predetermined target height range, and means for controlling the pressure supply system and the pressure control valve means for adjusting the height level of the portions of the vehicle body where the actutaors are provided to maintain the height level at the corresponding portion of the vehicle within the predetermined target range.

According to another aspect of the invention, a height control system for an automotive vehicle, comprises a plurality of suspension systems, each suspending a vehicular body relative to a corresponding vehicular wheel, a variable pressure actuator filled with pressurized working fluid and associated with each of the system for adjusting relative distance between the vehicle body and the vehicular wheel, a pressure supply system including a pressurized working fluid source, for increasing and decreasing pressure of the working fluid in the actuator for adjusting the relative distance between the vehicular body and the vehicular wheel, a plurality of pressure control valve means disposed within the pressure supply system for selectively establishing and blocking fluid communication between the pressure supply system and the corresponding actuators, a communication control valve disposed between one of the actuator and the corresponding one of the pressure control valve means for selectively establishing and blocking fluid communication between the one of actuators and the corresponding one of pressure control valve means, means for monitoring vehicular height at at least two different portions of the vehicle and operating the communication control valve to open for establishing fluid communication between the one of actuators and the the corresponding one of pressure control valve means when at least one of the height levels of the two portions is out of a predetermined target range and to close the communication control valve while all of the height levels monitored are within the predetermined target height range, and means for controlling the pressure supply system and the pressure control valve means for adjusting height level of the portions of the vehicle body where the actuators are provided to maintain the height level at the corresponding portions within the predetermined target range.

According to a further aspect of the invention, a height control system for an automotive vehicle, comprises first, second and third suspension systems respectively provided first, second and third mutually spaced portions of a vehicle body for suspending a vehicular body relative to corresponding first, second and third vehicular wheel, first, second and third variable pressure actuators filled with pressurized working fluid and associated with each of the first, second and third suspension systems for adjusting relative distance between the vehicle body and the vehicular wheel at corresponding first, second and third portions, a pressure supply passage network including a pressurized working fluid source, for adjusting pressure of the working fluid in the first, second and third actuators for adjusting the relative distance between the vehicular body and the vehicular wheel at corresponding first, second and third portions, a first and second pressure control valve means disposed within the pressure supply passage network, the first pressure control valve means being disposed between the first actuator and the pressure supply passage network for selectively establishing and blocking fluid communication therebetween, and the second pressure control valve means being disposed between the second and third actuators and the pressure supply passage network for selectively establishing and blocking fluid communication therebetween, a communication passage means provided downstream of the second pressure control valve means and connecting the second and third actuators, a communication control valve disposed within the communication passage means for selectively establishing and blocking fluid communication between the third actuator and the communication passage means, means for monitoring vehicular height at the first, second and third portions of the vehicle and operating the communication control valve to open for establishing fluid communication between the third actuator and the communication passage means when the height level of one of the first, second and third portions is out of a predetermined target height range and to close the communication control valve while all of the height levels at first, second and third portions are within the predetermined target height range, and means for controlling the pressure supply system and the first and second pressure control valve means for adjusting height level of the portions of the vehicle body to maintain the height level at the corresponding portion of the vehicle within the predetermined target range.

DESCRIPTION OF THE PREFERRED EMBODIMENT

Figure 1:
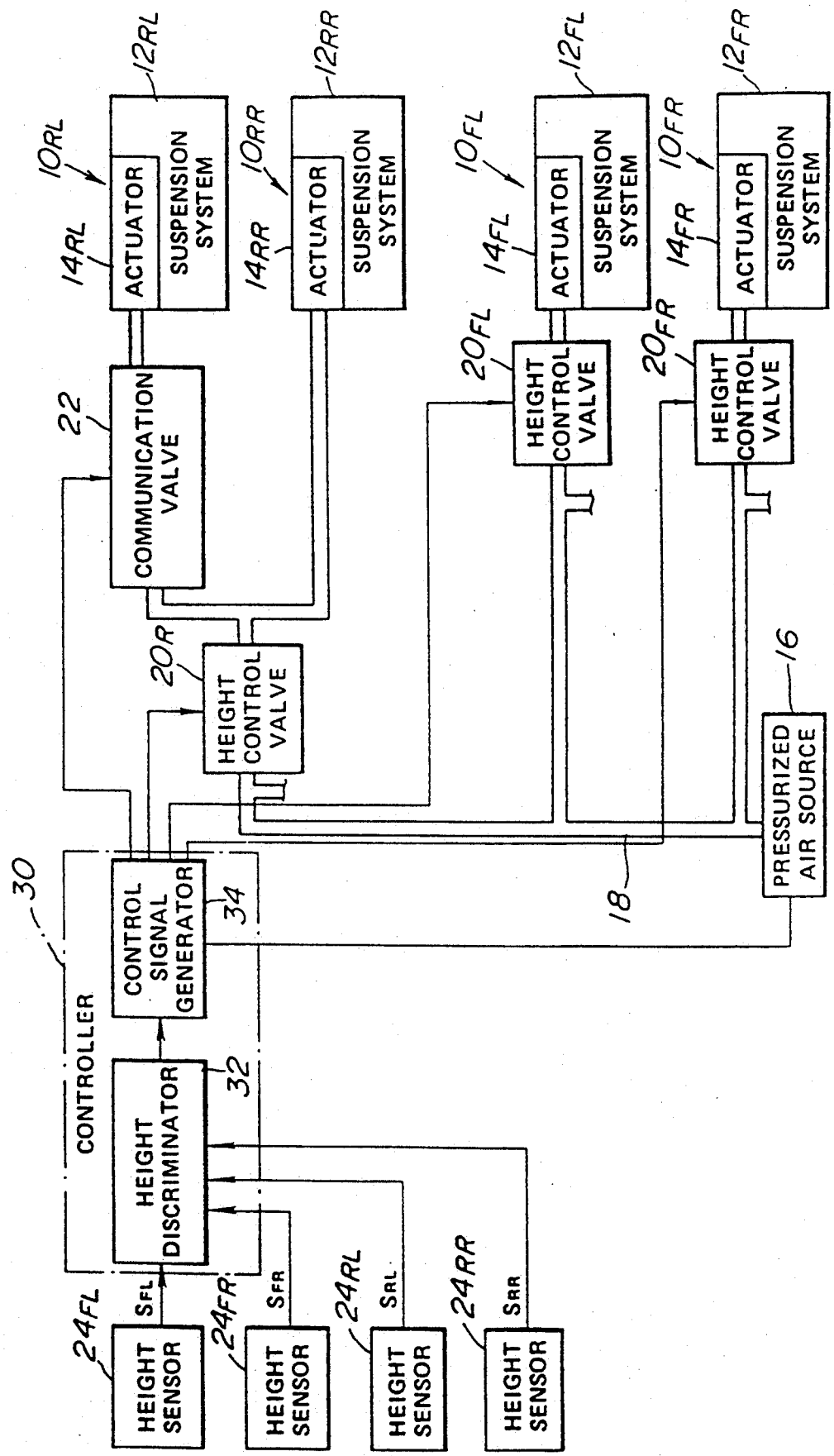
FIG. 1 is a conceptual block diagram of the preferred embodiment of a height control system in an automotive suspension system, according to the present invention.

Referring now to the drawings, particularly to FIG. 1, the preferred embodiment of a height control system in an automotive suspension system, according to the present invention, employs suspension system $10_{FL}$, $10_{FR}$, $10_{RL}$ and $10_{RR}$ for rotatably supporting front-left, front-right, rear-left and rear-right vehicular wheels.

The suspension systems $10_{FL}$, $10_{FR}$, $10_{RL}$ and $10_{RR}$ include suspension struts $12_{FL}$, $12_{FR}$, $12_{RL}$ and $12_{RR}$ which include shock absorbers and height control actuator means $14_{FL}$, $14_{FR}$, $14_{RL}$ and $14_{RR}$.

The actuator means $14_{FL}$, $14_{FR}$, $14_{RL}$ and $14_{RR}$ generally comprise pressure chambers filled with a working fluid. In the preferred embodiment, the pressure chambers $14_{FL}$, $14_{FR}$, $14_{RL}$ and $14_{RR}$ are filled with gas, such as an air. Each of the pressure chambers $14_{FL}$, $14_{FR}$, $14_{RL}$ and $14_{RR}$ is connected to a pressurized air source 16 via pressure supply system 18. Height control valve means $20_{FL}$, $20_{FR}$ and $20_R$ are disposed within the pressure supply system 18 for controlling air pressure to be supplied for respectively corresponding pressure chambers $14_{FL}$, $14_{FR}$, $14_{RL}$ and $14_{RR}$. As seen from FIG. 1, the height control valve means $20_R$ is designed for commonly adjusting the air pressure in the pressure chambers $14_{RL}$, $14_{RR}$ of the rear suspension systems $10_{RL}$ and $10_{RR}$. A communication valve means 22 is disposed between the pressure chamber $10_{FL}$ and the height control valve means $20_R$ for establishing and blocking fluid communication therebetween.

Height sensors $24_{FL}$, $24_{FR}$, $24_{RL}$ and $24_{RR}$ are provided at positions where the respective front-left, front-right, rear-left and rear-right suspension systems $10_{FL}$, $10_{FR}$, $10_{RL}$ and $10_{RR}$ are provided for monitoring relative height between vehicle body 26 and suspension members $28_{FL}$, $28_{FR}$, $28_{RL}$ and $28_{RR}$ (shown in FIG. 2) which are connected to the vehicular wheels. Respective height sensors $24_{FL}$, $24_{FR}$, $24_{RR}$ produces vehicle height indicative signals $S_{FL}$, $S_{FR}$, $S_{RL}$ and $S_{RR}$. The vehicle height indicative $S_{FL}$, $S_{FR}$, $S_{RL}$ and $S_{RR}$ of the height sensors $24_{FL}$, $24_{FR}$, $24_{RL}$ and $24_{RR}$ are fed to a controller 30.

The controller 30 includes a discriminator stage 32 and a control signal generator stage 34. The vehicle height indicative signals $S_{FL}$, $S_{FR}$, $S_{RL}$ and $S_{RR}$ are input to the discriminator stage 32 of the controller. In the discriminator stage 32, each of the vehicle height indicative signals $S_{FL}$, $S_{FR}$, $S_{RL}$ and $S_{RR}$ is compared with a maximum height indicative upper criterion $H_U$ and a minimum height indicative lower criterion $H_L$ to discriminate whether the vehicle height as represented by the corresponding vehicle height indicative signal is within a target height range defined by the upper and lower criteria $H_U$ and $H_L$.

When the vehicle height level out of the target height range, the control signal generator stage 34 is triggered for operation. In response to initiation of the operation of the control signal generator stage 34, a communication valve control signal is, at first, output to the communication valve 22 to open the latter. As a result, communication is achieved between the pressure chamber $14_{RL}$ and the height control valve means $20_R$. Thereafter, the height control signal is output from the control signal generator stage 34. In response to the height control signal of the control signal generator stage 34, respective height control valve means $20_{FL}$, $20_{FR}$ and $20_R$ are operated to adjust the vehicle height level at respectively corresponding wheel positions to be within the target height range. Thereafter, the communication valve control signal from the control signal generator stage 34 terminates to shut the communication valve 22. This blocks communication between the height control valve means $20_R$ and the pressure chamber $14_{RL}$ to maintain the pressure in the latter at the adjusted value. While the communication valve means 22 is in blocking position, fine height adjustment can be performed by maintaining the height control valve means $20_{FL}$, $20_{FR}$ and $20_R$ open in connection with the front-left, front-right and rear-right wheels.

This reduces possibility of occurence of hunting in height adjustment and makes the vehicular height as adjusted, stable.

Detailed construction and height control operation will be discussed herebelow with reference to FIGS. 2 and 3. In the following discussion, the components constituting the preferred embodiment of the vehicular height control system, which have been already discussed in the general discussion with respect to FIG. 1, will be represented by the same reference numerals and redundent discussion will be neglected.

Figure 2:
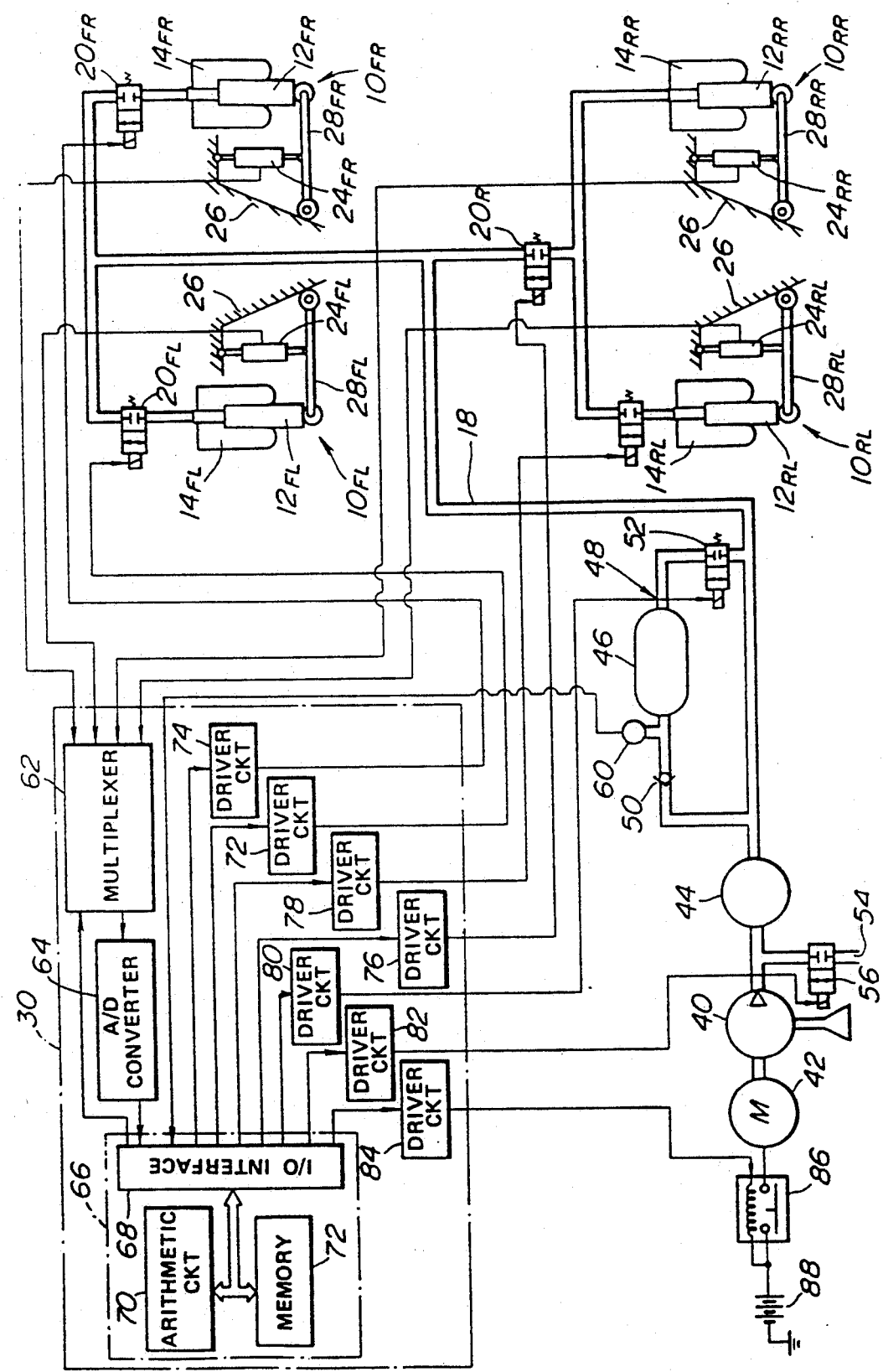
FIG. 2 is a detailed block diagram of the preferred embodiment of the automotive height control system.

As shown in FIG. 2, the air source 16 comprises a compressed air supply network including a motor driven compressor 40 which is associated with an electric motor 42 to be driven by the driving force transmitted therefrom. The compressor 40 is connected to the pressure supply passage system 18. An air dryer 44 is disposed in the pressure supply passage system 18 and downstream of the compressor for drying the air fed from the compressor. In addition, a pressure accumulator 46 is provided in a pressure accumulation system 48 which is in communication with the pressure supply passage system 18 at both ends. An one-way check valve 50 is provided in the pressure accumulation system 48 upstream of the pressure accumulator 46. An electromagnetically actuated pressure accumulation control valve 52 is provided downstream of the pressure accumulator 46.

The pressure supply passage system 18 includes a ventilation port 54, at which a ventilation control valve 56 is provided for opening and closing the port.

As seen from FIG. 2, the height control valve means $20_{FL}$, $20_{FR}$ and $20_R$ comprise electromagnetically actuated valves. Also, the communication valve means 22 comprises an electromagnetically actuated valve.

The height control valves $20_{FL}$, $20_{FR}$ and $20_R$, the communication valve 22, the pressure accumulation control valve 52 and the ventilation control valve 56 are respectively connected to the controller 30 to be controlled in respective valve positions. The height control valves $20_{FL}$, $20_{FR}$ and $20_R$, employed in the shown embodiment, are so designed as to open while they are activated, to establish communication between the pressure chambers $14_{FL}$, $14_{FR}$, $14_{RL}$ and $14_{RR}$ and the pressure supply passage system 16 and to close while they are deactivated, to block the communication. On the other hand, the communication valve 22 is designed to be open to establish communication between the height control valve $20_R$ and the pressure chamber $14_{FL}$, when activated and to close to block the communication, when deactivated. The accumulation control valve 52 is so designed as to be activated to open for establishing communication between the pressure accumulator 46 and the pressure supply passage means 16 and to be deactivated to close for blocking the communication. The ventilation control valve 56 is designed to be activated to open the valve for exposing the pressure supply passage means 16 to the atmosphere for ventilation of the pressurized air through the ventilation port 54 and to be deactivated to shut the valve.

In order to monitor the pressure accumulated in the pressure accumulator 46, a pressure sensor 60 is provided. The pressure sensor 60 is designed for generating an accumulated pressure indicative signal to be input to the controller 30 as a compressor control parameter.

The height sensors $24_{FL}$, $24_{FR}$, $24_{RL}$ and $24_{RR}$, employed in the shown embodiment, comprise stroke sensors disposed between the vehicle body 26 and the suspension members $28_{FL}$, $28_{FR}$, $28_{RL}$ and $28_{RR}$. Each of the stroke sensors $24_{FL}$, $24_{FR}$, $24_{RL}$ and $24_{RR}$ may comprise an electrostatic capacity-type stroke sensor as shown in FIGS. 3 and 4.

Figure 3:
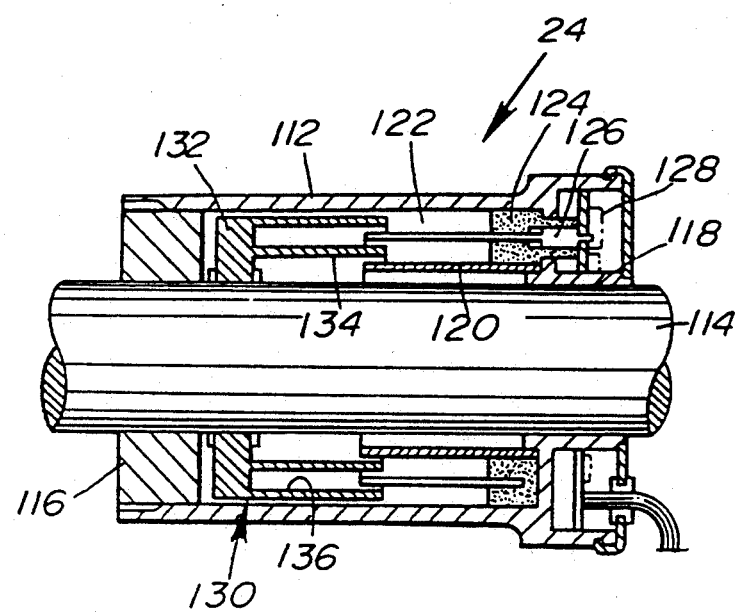
FIG. 3 is a partial and longitudinal section of one example of a vehicle height sensor to be employed in the preferred embodiment of the vehicle height control system according to the invention.
Figure 4:
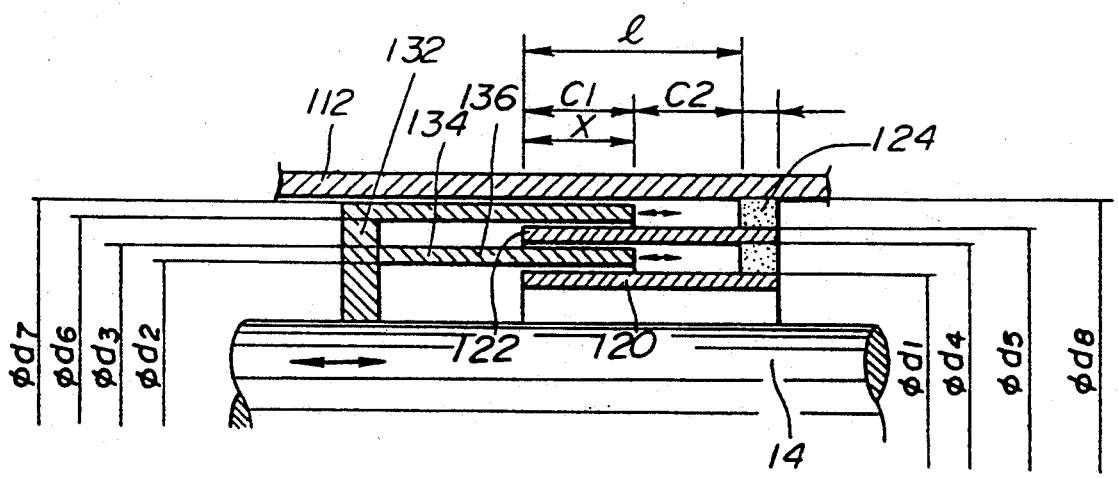
FIG. 4 is an enlarged section of the major part of the vehicle height sensor of FIG. 3.

As shown in FIGS. 3 and 4, the preferred example of the electrostatic capacity-type stroke sensor is generally represented by the reference numeral '110'. The electrostatic capacity-type stroke sensor 110 is designed for measuring relative stroke between a cylindrical member 112 and a rod member 114. In the shown construction, the rod member 114 is coaxially arranged through the cylindrical member 112 and thrustingly supported by means of supporting plug 116 and a cylindrical support section 118 integrally formed with the cylindrical member.

Both of the cylindrical member 112 and the rod member 114 are made of electrically conductive material and, in turn, electrically isolated from each other.

Inner and outer cylinders 120 and 122 are coaxially disposed between the cylindrical member 112 and the rod member 114. The cylindrical member 112, the outer cylinder 122, the inner cylinder 120 and the rod member 114 are coaxially arranged in spaced apart relationship and held in place by means of an annular support 124 which is made of an electrically insulative material.

The inner cylinder 120 is electrically connected to the cylindrical member 112 to constitute therewith a grounding electrode. On the other hand, the outer cylinder 122 is connected to a terminal 126 which is, in turn, connected to a sensor circuit 128. In the shown embodiment, the sensor circuit 128 comprises a RC oscillator. The outer cylinder 122 is designed to function as positive electrode. The sensor circuit 128 is also connected to the grounding electrode formed by the inner cylinder 120 and the cylindrical member 112 to be grounded therethrough.

With the plug 116, the cylindrical supporting section and the insulative support 124 establishes gas tight seal. A gaseous state dielectric material which has stable dielectric constant is filled in the enclosed space.

On the other hand, a dielectric member 130 is provided for movement with the rod member 114. The dielectric member comprises a radially extending disk-shaped section 132 and coaxially arranged inner and outer cylindrical Sections 134 and 136. The inner diameter $\phi d_2$ of the inner cylindrical section 134 of the dielectric member 130 is greater than the outer diameter $\phi d_1$ of the inner cylinder 120 and the outer diameter $\phi d_3$ is smaller than the inner diameter $\phi d_4$ of the outer cylinder 122 so that the inner cylindrical section 134 may enter into the annular space defined between the inner and outer cylinders 120 and 122, as shown in FIG. 3. On the other hand, the inner diameter $\phi d_6$ of the outer cylindrical section 136 is greater than the outer diameter $\phi d_5$ of the outer cylinder 122 and the outer diameter $\phi d_7$ is smaller than the inner diameter $\phi d_8$ of the cylindrical member 112 so that the outer cylindrical section may enter into the annular space defined between the outer cylinder 122 and the cylindrical member. On the other hand, the disk-shaped section 132 is rigidly fixed to the outer periphery of the rod member 114 so that the dielectric member 130 may be moved according to movement of the rod member 114.

With the construction set forth above, the electrostatic capacity Ct is created between the inner and outer cylinders 120 and 122 and the inner and outer cylindrical sections 134 and 136 of the dielectric member 130 while relative displacement between the cylindrical member 112 and the rod member 114 occurs.

Here, assuming the possible maximum relative stroke between the cylindrical member 112 and the rod member 114 is as shown in FIG. 3; the relative dielectric constant of the dielectric member is $\epsilon_2$; and the relative dielectric constant of the gaseous dielectric material is $\epsilon_1$. It is further assumed that the electrostatic capacity of overlapping portion between the inner and outer cylindrical sections 134 and 136 and the inner and outer cylinders 120 and 122 is $C_1$; the electrostatic capacity of the portions of the inner and outer cylinders 120 and 122 outside of the inner and outer cylindrical sections 134 and 136 is $C_2$; and the electrostatic capacity of the portion where the inner and outer cylinders 120 and 122 are supported is $C_3$. In this case, the electrostatic capacities $C_t$, $C_1$ and $C_2$ can be respectively illustrated by the following equations:

$$C_t = C_1 + C_2 + C_3 \quad (1)$$

$$C_1 = 2\pi\epsilon_0 x [1/\{(1/\epsilon_2 - 1/\epsilon_1) \ln \cdot d_3/d_2 + 1/\epsilon_1 \cdot \ln d_4/d_1\} + (1/(1/\epsilon_2 - 1/\epsilon_1) \ln \cdot d_7/d_6 + 1/\epsilon_1 \cdot \ln d_8/d_5\}] \quad (2)$$

$$C_2 = \pi\epsilon_0 (1-x) \cdot [1/\{(1-\epsilon_1) \ln(d_4/d_1) + 1/\}(1-\epsilon_1) \ln(d_8/d_5)]\} \quad (3)$$

where $\epsilon_0$ is dielectric constant in vacuum
Here, it is assumed:
$$[1/\{(1/\epsilon_2 - 1/\epsilon_1) \ln \cdot d_3/d_2 + 1/\epsilon_1 \cdot \ln d_4/d_1\} + \{1/(1/\epsilon_2 - 1/\epsilon_1) \ln \cdot d_7/d_6 + 1/\epsilon_1 \cdot \ln d_8/d_5\}] = A; \text{ and}$$

$$[1/\{(1-\epsilon_1) \ln(d_4/d_1)\} + 1/\{(1-\epsilon_1) \ln(d_8/d_5)\}] = B$$

A and B are both constant. The equations (2) and (3) can be modified utilizing A and B. the electrostatic constant Ct can be illustrated by:
$$C_t = 2\pi\epsilon_0 x(A-B) + 2\pi\epsilon_0 1 B + C_3 \quad (4)$$

As will be appreciated herefrom, the electrostatic constant Ct is variable in proportion to the stroke x.

As set forth, the detector circuit comprises the RC oscillator whose oscillation cycle period can be described by:

$$T = (1/K)RC \quad (5)$$

where K is constant.

From this the frequency output characteristics of the RC oscillator can be described by:

$$T = (R/K)2\pi\epsilon_0 x(A-B) + C_0 \quad (6)$$

where $C_0 = 2\pi\epsilon_0 1 B + C_3$

As will be appreciated from the foregoing equations, the frequency oscillation cycle period T is proportional to the relative displacement stroke x. Therefore, by monitoring the frequency oscillation cycle period T, the stroke x can be detected.

Here, the diameters $\phi d_1$ through $\phi d_8$ can be varied depending upon the temperature of atmosphere due to thermal expansion. Among those variable dimensions, the ratios $\phi d_3/\phi d_2$ and $\phi d_7/\phi d_6$ are regarded constant despite of various rate of thermal expansions. Similarly, the ratios $\phi d_4/\phi d_1$ and $\phi d_8/\phi d_5$ are regarded constant On the other hand, the dielectric constants $\epsilon_1$ and $\epsilon_2$ gaseous dielectric material filled in the space defined in the cylindrical member and the dielectric member 130 can be made to be substantially constant at any temperature range by appropriately selecting the materials. For example, the dielectric material which exhibits stable dielectric constant in relation to temperature variation may be selected from among air or resin, such as polyacetal resin polypropylene resin. Therefore, as a gaseous dielectric material, the air may be used in the preferred embodiment so as to avoid influence of the temperature variation and to obtain stable dielectric constant thereof.

However, as the dielectric material for forming the dielectric member 130, a material which can provide higher resolution in measurement of the relative stroke between the rod member and the cylindrical member, is preferred. In order to obtain higher resolution, greater electrostatic capacity to be established becomes necessary. This, in turn, requires higher dielectric constant of the dielectric material forming the dielectric member 130. Satisfactorily high dielectric constant is obtainable by utilizing inorganic material, such as mica. Such inorganic material is known to have a substantially high dielectric constant but is know as an expensive material and as a difficult material for machining and/or mass-production. On the other hand, synthetic resins are less expensive and easy for forming a desired shape. However, synthetic resins generally have low or insufficient dielectric constants as required for the stroke sensor of the type disclosed hereabove.

In this view, the preferred embodiment of the stroke sensor, according to the present invention, employs a composite dielectric material which is a composition of a synthetic resin material and inorganic material. As a resin material to form the composition, a thermoplastic resin, such as polypropylene, sulfide and so forth are preferred in view of solubility with the inorganic material. As an inorganic material. ceramics are used.

Each of the stroke sensors $24_{FL}$, $24_{FR}$, $24_{RL}$ and $24_{RR}$ are connected to the controller 30 via a multiplexer 62 and an analog-to-digital (A/D) converter 64. On the other hand, the controller 30 comprises a microprocessor 66 having an input/output interface 68, an arithmetic circuit 70, such as CPU, and a memory 72, such as ROM, RAM, register and so forth. The input/output interface 68 is connected to the A/D converter to receive one of the height indicative signals from the corresponding one of the stroke sensors $24_{FL}$, $24_{FR}$, $24_{RL}$ and $24_{RR}$ as selected by the multiplexer 62. The multiplexer 62, is designed to receive a clock signal output from the microprocessor to select one of the height indicative signals in a given order and at a given timing.

The input/output interface 68 is also connected to driver circuits 72, 74, 76, 78, 80, 82. to feed control signals thereto.

The driver circuits, 72, 74 and 76 are respectively connected to the height control valves $20_{FL}$, $20_{FR}$ and $20_R$, to feed height control driver signals thereto. The driver circuits 72, 74 and 76 output HIGH level height control driver signals when the height level of respectively corresponding vehicle body portions is out of the target height range and, otherwise, output LOW level height control driver signals. Therefore, the height control valves $20_{FL}$, $20_{FR}$ and $20_R$ are responsive to the HIGH level height control signal to be activated and to the LOW level height control signal to be deactivated. Similarly, the driver circuit 78 is connected to feed a HIGH level communication control driver signal in response to a communication demand indicative signal from the microprocessor 66 to activate the communication valve, and, otherwise, to feed the LOW level communication control driver signal to deactivate the communication valve. Furthermore, the driver circuit 80 is connected to the pressure accumulation control valve 52 to feed a HIGH level accumulator control signal to open the latter for establishing communication between the pressure accumulator 46 and the pressure supply system 18 and to feed a LOW level accumulator control signal to close the latter for blocking the communication.

The driver circuit 82 is connected to the ventilation control valve 56 to open in order to expose the pressure supply system 18 to the atmosphere by HIGH level ventilation control signal and to shut for closing the pressure supply system.

In addition, the microprocessor 66 detects the pressure in the pressure accumulator 46 dropping lower than a predetermined pressure to generate a compressor control signal. The compressor control signal is fed to a driver circuit 84 via the input/output interface 68. The driver circuit 84 is connected to a power supply control relay 86 which establishes and blocks electric connection between the electric motor 42 and a vehicular battery 88. In response to the compressor control signal, the driver circuit 84 produces a compressor drive signal for energizing the power supply control relay 86 for establishing electric connection between the battery 88 and the motor 42 to drive the motor. As a result, the compressor 40 is driven by the driving force of the motor 42 to supply the pressure to the pressure accumulator 46.

Figure 5A:
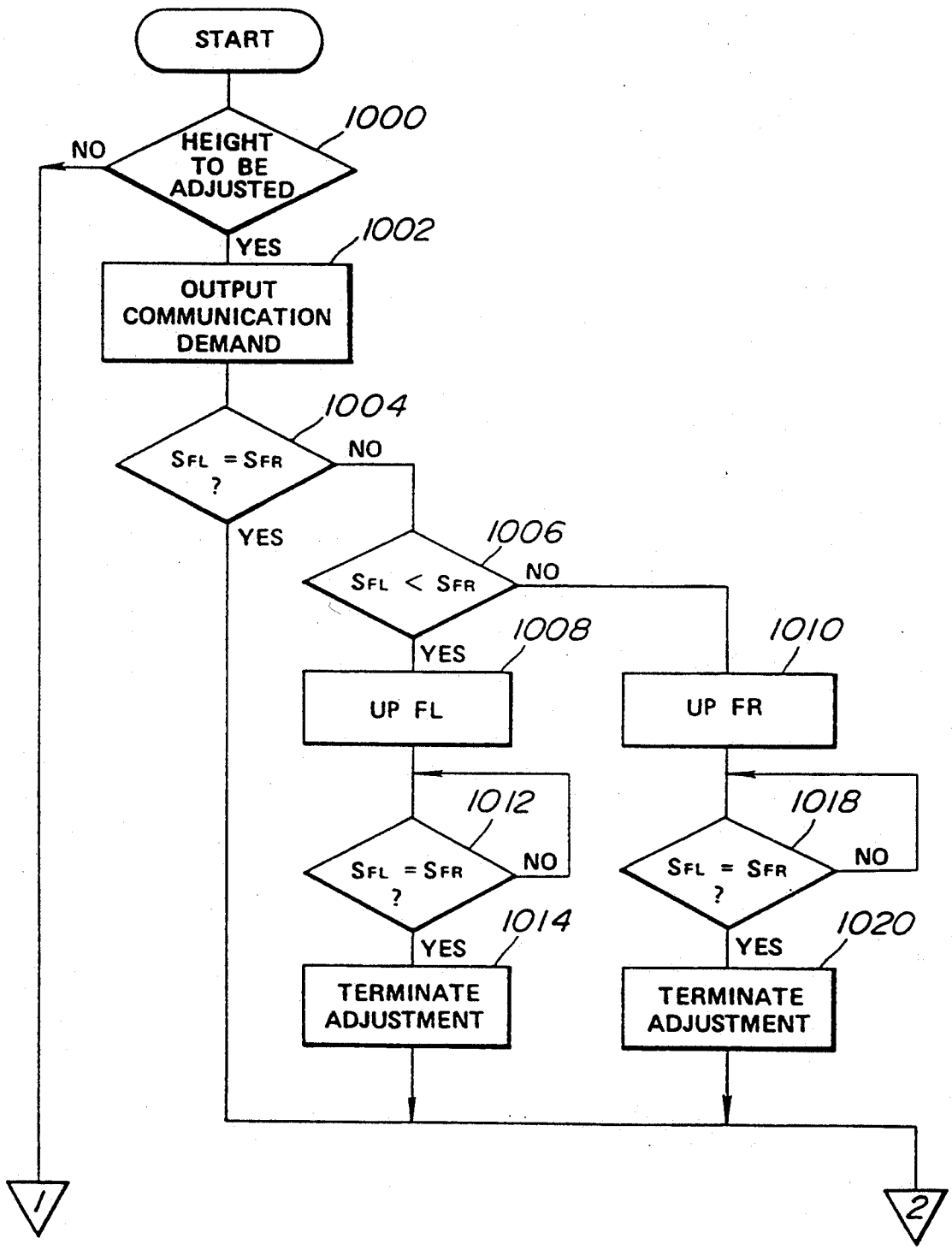
FIGS. 5(A) and 5(B) are flowchart showing a sequence of a vehicle height control program for controlling height position of a vehicle body relative to a suspension member.
Figure 5B:
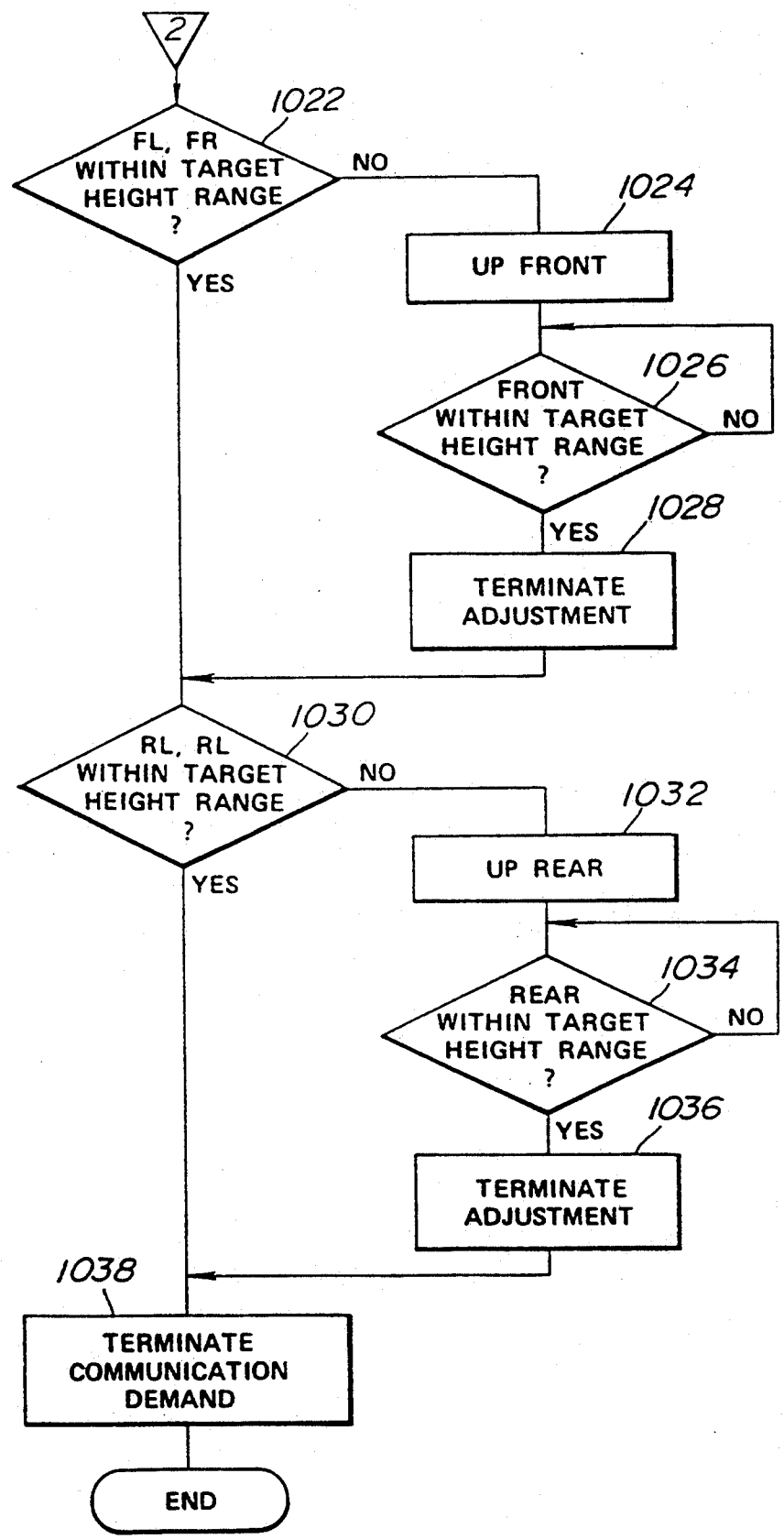

The process height control to be performed in the preferred embodiment of the vehicular height control system, according to the present invention, will be discussed herebelow with reference to FIGS. 5(A) and 5(B). FIGS. 5(A) and 5(B) show flowcharts for a vehicle height control program for adjusting the vehicular height.

The height control program is triggered at a predetermined constant timing. Immediately after starting the height control program, vehicle height indicative signal values $S_{FL}$, $S_{FR}$, $S_{RL}$ and $S_{RR}$ are read out, at a step 1000. Each of the rear vehicle height indicative signal values $S_{FL}$, $S_{FR}$, $S_{RL}$ and $S_{RR}$ is checked whether the vehicle height indicative signal value represents the vehicular height within a target height range. In practice, the foregoing check is performed by comparing upper and lower height reference values $H_{Uref}$ and $H_{Lref}$ which define the target height range. If none of the height indicative signal values $S_{FL}$, $S_{FR}$, $S_{RL}$ and $S_{RR}$ is greater than the upper height reference value $H_{Uref}$ or smaller than the lower height reference value $H_{Lref}$, the process goes to the END.

On the other hand, if at least one of the vehicle height indicative signal values $S_{FL}$, $S_{FR}$, $S_{RL}$ and $S_{RR}$ is greater than the upper height reference value $H_{Uref}$ or smaller than the lower height reference value, as checked at the step 1000, process goes to a step 1002. At the step 1002, the communication demand indicative signal is output from the microprocessor 66 to the driver circuit 78. Therefore, the driver circuit outputs the communication control driver signal to open the communication valve 22. By opening of the communication valve 12, communication between the pressure chambers $14_{RL}$ and the height control valve means $20_R$.

After opening the communication valve 22, process goes to a step 1004 to check whether the front-left and front-right vehicle height indicative signal values $S_{FL}$ and $S_{FR}$ are even. If front-left and front-right vehicle height indicative signal values $S_{FL}$ and $S_{FR}$ are not the same, check is performed whether the front-left vehicle height indicative signal value $S_{FL}$ is smaller than that of the front right vehicle height indicative signal $S_{FR}$, at a step 1008.

When the front-left vehicle height indicative signal value $S_{FL}$ is smaller than that of the front-right vehicle height indicative signal $S_{FR}$, as checked at the step 1008, an UP command for lifting up the front-left portion of the vehicle body is generated at a step 1010. In response to this, the height control driver signal is fed to the height control valve means $20_{FL}$ to open the latter for establishing communication between the pressure chamber $14_{FL}$. Simultaneously, the accumulator control signal is fed to the driver circuit 80 for opening the pressure accumulation control valve 52 to introduce the pressurized air into the pressure chamber $14_{FL}$ of the front-left suspension system $10_{FL}$.

At this time, the pressure in the pressure accumulator 46 is continuously monitored by the pressure sensor 60 so that the compressor 40 may be driven when the pressure drops below a predetermined level.

By introducing the pressurized pressure into the pressure chamber $14_{FL}$, the height at the: front-left portion of the vehicle body is raised. The front-left height indicative signal $S_{FL}$ is again compared with that of the front-right vehicle height indicative signal value $S_{FR}$ which is held unchanged, at a step 1012. The UP command is maintained and check at the step 1012 and is repeated until the front-left vehicle height indicative signal value $S_{FL}$ becomes equal to the front-right vehicle height indicative signal value $S_{FR}$. When the front-left vehicle height is raised to the same level as the front-right height level, the UP command is terminated at a step 1014.

On the other hand, if the front-right vehicle height signal value $S_{FR}$ is greater than that of the front-left vehicle height indicative signal $S_{FL}$, as checked at the step 1008, an UP command for lifting up the front-right portion of the vehicle body is generated at a step 1016. In response to this, the height control driver signal is fed to the height control valve means $20_{FR}$ to open the latter for establishing communication between the pressure chamber $14_{FR}$. Simultaneously, the accumulator control signal is fed to the driver circuit 80 for opening the pressure accumulation control valve 52 to introduce the pressurized air into the pressure chamber $14_{FR}$ of the front-right suspension system $10_{FR}$.

By introducing the pressurized pressure into the pressure chamber $14_{FR}$, the height at the front-right portion of the vehicle body is raised. The front-right height indicative signal value $S_{FR}$ is again compared with that of the front-left vehicle height indicative signal value $S_{FL}$ which is held unchanged, at a step 1018. The UP command is maintained and checked at step 1018, and is repeated until the front-right vehicle height indicative signal value $S_{FR}$ becomes equal to the front-left vehicle height indicative signal value $S_{FL}$. When the front-right vehicle height is raised at the same level to the front-left height level, the UP command is terminated at a step 1020.

After the step 1014 or 1020, the process goes to a step 1022. On the other hand, when the front-left and front-right vehicle heights are the same as checked at the step 1006, the process also goes to the step 1022.

At the step 1022, check is performed whether or not the height level of the front portion of the vehicle body is within the target height range. The check is performed by determining whether one of the front-left and front-right vehicle height indicative signal values $S_{FL}$ and $S_{FR}$ is the same as the other. If the front vehicle height is lower than the lower height reference $H_{Lref}$ an UP command is output at a step 1024. On the other hand, if the front vehicle height is higher than the upper height reference value $H_{Uref}$, a DOWN command is output at the step 1024.

When the UP or DOWN command is output at the step 1024, the driver circuits 72 and 76 become active to output height control driver signals to open the front-left and front-right height control valve means $20_{FL}$ and $20_{FR}$ to establish communication between the pressure supply system 18 and the pressure chambers $14_{FL}$ and $14_{FR}$. In the case of an UP command, the driver circuit 80 is also activated to feed the pressure accumulation control driver signal to open the pressure accumulation control valve means 52. By this, the pressure accumulator 46 is communicated with the pressure supply system 18 to introduce the pressurized air to the pressure chambers $14_{FL}$ and $14_{FR}$. On the other hand, in the case of a DOWN command, the driver circuit 80 is held inoperative to maintain the pressure accumulation control valve means 52 at the closed position. On the other hand, the driver circuit 82 becomes active to operate the ventilation control valve 56 to expose the pressure supply system 18 toward the atmosphere via the ventilation port 54.

An UP or DOWN command output at the step 1024, is maintained until the height level at the front portion of the vehicle is adjusted within the target height range. At a step 1026, the height level at the front portion of the vehicle body is checked whether or not the height is within the target height range. This step is cyclically repeated until the height level at the front portion of the vehicle is adjusted to be within the target height range. When the height at the front portion within the target height range is detected as checked at the step 1026, the UP or DOWN command is terminated at a the step 1028.

When the height level at the front portion of the vehicle body is within the target height range as checked at the step 1022 or after the step 1028, process goes to a step 1030.

At the step 1030, a check is performed to determine whether height level of the rear portion of the vehicle body is within the target height range. The check is performed by determining whether one of the rear-left and rear-right vehicle height indicative signal values $S_{RL}$ and $S_{RR}$ is the same as the other. If the rear vehicle height is lower than the lower height reference $H_{Lref}$ an UP command is output at a step 1032. On the other hand, if the rear vehicle height is higher than the upper height reference value $H_{Uref}$ a DOWN command is output at the step 1032.

When the UP or DOWN command is output at the step 1032, the driver circuit 76 becomes active to output height control driver signals to open the rear-left and rear-right height control valve means $20_R$ to establish communication between the pressure supply system 18 and the pressure chambers $14_{RL}$ and $14_{RR}$. In the case of an UP command, the driver circuit 80 is also activated to feed the pressure accumulation control driver signal to open the pressure accumulation control valve means 52. By this, the pressure accumulator 46 is communicated with the pressure supply system 18 to introduce the pressurized air to the pressure chambers $14_{RL}$ and $14_{RR}$. On the other hand, in case of a DOWN command, the driver circuit 80 is held inoperative to maintain the pressure accumulation control valve means 52 at closed position. On the other hand, the driver circuit 82 becomes active to operate the ventilation control valve 56 to expose the pressure supply system 18 toward the atmosphere via the ventilation port 54.

UP or DOWN command output at the step 1032, is maintained until the height level at the rear portion of the vehicle is adjusted within the target height range. At a step 1034, the height level at the rear portion of the vehicle body is checked whether the height is within the target height range. This step is cyclically repeated until the height level at the rear portion of the vehicle is adjusted within the target height range. When the height at the rear portion within the target height range is detected as checked at the step 1034, the UP or DOWN command is terminated at a step 1036.

When the height level at the rear portion of the vehicle body is within the target height range as checked at the step 1030 or after the step 1036, the process goes to a step 1038 to terminate the communication command to shut the communication valve 22.

After shutting the communication valve at the step 1038, the process goes to END.

Figure 6:
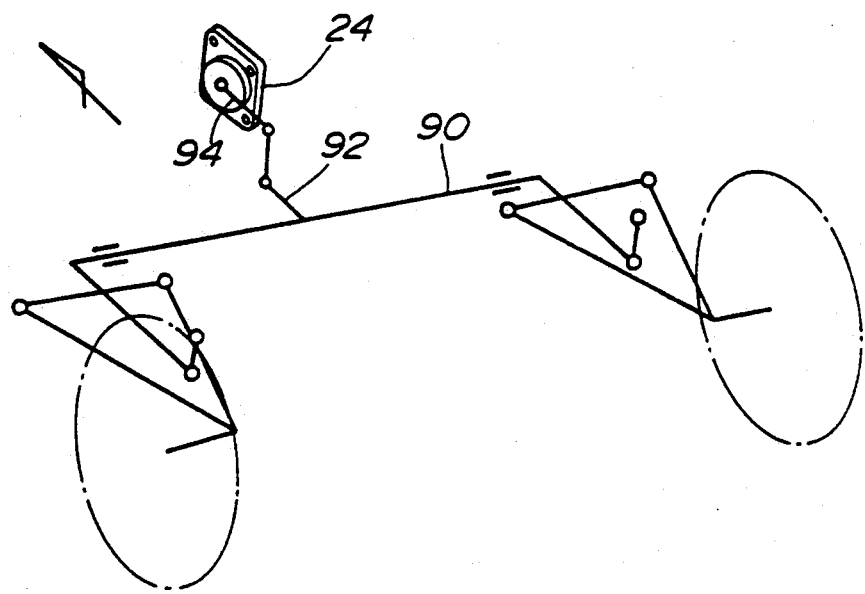
FIG. 6 is an illustration of another example of a vehicle height sensor to be employed in the height control system according to the invention.

Though the foregoing embodiment of the height control system, employing four height sensors for monitoring the front-left, front-right, rear-left and rear-right height levels independently of each other, it may be possible to reduce the number of the height sensor to be employed by employing a sensor which commonly monitors average height between the left and right sides of the vehicle body. An example of the height sensor which can monitor the average height between the rear-left and rear-right portion of the vehicle body is illustrated in FIG. 6. In the shown example, the height sensor 24 is connected to a rear stabilizer 90 via a linkage system 92. The height sensor 24 has a sensor body fixed onto the vehicle body and a vertically pivotal arm 94 connected to the linkage system 92 so as to cause swing movement according to up and down relative movement of the vehicle body relative to the stabilizer.

Such type of vehicular height sensor has been in the U.S. Pat. No. 4,436,381, issued Mar. 13, 1984. In addition, one of the typical construction of the suspension strut has been disclosed in the British Patent First Publication 2,084,692. The disclosures of the above-identified United States Patent and the British Patent First Publication are herein incorporated by reference for the sake of disclosure.

In addition, though the shown embodiment provides the communication valve for establishing and blocking communication between the rear-left pressure chamber and the pressure supply system and adjust the rear-left and rear-right heights of the vehicle body with a common height control valve means, the valve arrangement for the rear suspension systems as shown may be applicable for the front suspension systems.

Furthermore, through the shown embodiment employs air as working fluid for performing vehicular height adjustment, it would be possible to employ another working fluid, such as a gaseous fluid other than air, or a viscous or liquid state fluid.

What is claimed is:

1. A height control system for an automotive vehicle comprising:
   a first suspension unit including: a first variable pressure actuator which is provided at a first end portion of a first lateral side of a vehicle body interposed between the vehicle body and a first suspension member which rotatably supports an associated first rod wheel; and a second variable pressure actuator which is provided at the first end portion of a second lateral side opposing the first lateral side interposed between the vehicle body and a second suspension member which rotatably supports an associated second rod wheel;
   a second suspension unit including: a third variable pressure actuator which is provided at a second end portion of the first lateral side of the vehicle body interposed between the vehicle body and a third suspension member rotatably supporting an associated third road wheel; and a fourth variable pressure actuator which is provided at the second end portion of the second lateral side interposed between the vehicle body and a fourth suspension member which rotatably supports an associated fourth road wheel;
   sensor means for sensing vehicle height levels of at least three different portions of the vehicle body respectively associated with three of the first, second, third, and fourth variable pressure actuators and provides signals indicative thereof;
   a pressure supply system including a pressure source which supplies working fluid to the first, second, third, and fourth variable pressure actuators for varying pressure in the first, second, third, and fourth actuators;
   a first valve connected between said pressure source and the first variable pressure actuator to establish fluid communication therebetween for increasing and decreasing the pressure of the working fluid in the first variable pressure actuator to adjust relative distance between the vehicle body and the associated first road wheel;
   a second valve connected between said pressure source and the second variable pressure actuator to establish fluid communication therebetween for increasing and decreasing the pressure of the working fluid in the second variable pressure actuator to adjust a relative distance between the vehicle body and the associated second road wheel;
   a fluid communication path for establishing fluid communication connected between the third and fourth variable pressure actuators;
   a third valve connected between said pressure source and said fluid communication path for increasing and decreasing the pressure of the working fluid in the third and fourth variable pressure actuators to adjust relative distances between the vehicle body and the associated third and fourth road wheels;
   a communication valve connected to said communication path for establishing and blocking fluid communication between the third and fourth variable pressure actuators; and
   control means responsive to the signals from said sensor means to provide a control signal when at least one of the vehicle height levels is out of a target vehicle height range to activate said communication valve to balance the working fluid pressures in the third and fourth variable pressure actuators and then to activate at least one of the first, second, and third valves for controlling pressure of working fluid therein to adjust a vehicle height level within the target vehicle height range.

2. A height control system as set forth in claim 1, wherein said control means maintains said communication valve activated while at least one of the first, second, and third valves is kept activated.

3. A height control system as set forth in claim 1, wherein said first suspension unit is provided for front wheels and said second suspension unit is provided for rear wheels.

4. A method for controlling a height level in an automotive vehicle having a plurality of wheels; a corresponding number of suspension units for suspending the vehicle with respect to each of the wheels; a variable pressure actuator associated with each of said suspension units; a pressure supply system for supplying working fluid to the variable pressure actuators for varying pressure therein; a plurality of pressure control valves connected between said pressure supply system and said variable pressure actuators respectively, to establish and block fluid communication therebetween for increasing and decreasing the pressure of the working fluid in the actuators to adjust relative distances between the vehicular body and the wheels; a fluid communication path connected to one of said pressure control valves for establishing fluid communication between at least two of said variable pressure actuators; a communication control valve connected to said communication path to block and establish fluid communication between said at least two variable pressure actuators; sensor means for detecting vehicle height levels of at least three different portions of the vehicle associated with three of said variable pressure actuators and providing signals indicative thereof; and control means for receiving signals from said sensor means for activating said pressure control valves to control the fluid pressures supplied to the actuators, comprising the steps of:

determining whether at least one of the vehicle height levels is out of a target vehicle height range;

activating said communication control valve to balance the working fluid pressures between said at least two variable pressure actuators when said at least one of the vehicle height levels is out of said target vehicle height range; and activating at least one of said pressure control valves to control pressure of the working fluid therein to adjust a vehicle height level within the target vehicle height range.

5. A method as set forth in claim 4, further comprising the step of maintaining said communication control valve activated while at least one of said pressure control valves is kept activated.

* * * * *